(12) United States Patent
Harkensee et al.

(10) Patent No.: US 8,332,245 B2
(45) Date of Patent: *Dec. 11, 2012

(54) SYSTEM AND METHOD FOR SELLING INSURANCE USING RAPID DECISION TERM

(75) Inventors: James Harkensee, Arlington Heights, IL (US); Richard A. Hemmings, Glenview, IL (US)

(73) Assignee: Fidelity Life Association, Oakbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,396

(22) Filed: Dec. 12, 2011

(65) Prior Publication Data

US 2012/0084104 A1 Apr. 5, 2012

Related U.S. Application Data

(63) Continuation of application No. 12/260,706, filed on Oct. 29, 2008, now Pat. No. 8,082,163, which is a continuation-in-part of application No. 12/013,962, filed on Jan. 14, 2008.

(51) Int. Cl.
*G06Q 40/00* (2012.01)
(52) U.S. Cl. ............................................................. 705/4
(58) Field of Classification Search ...................... None
See application file for complete search history.

(56) References Cited

U.S. PATENT DOCUMENTS

| | | | |
|---|---|---|---|
| 7,370,000 B2 | 5/2008 | Sherman | |
| 7,685,007 B1 | 3/2010 | Jacobson | |
| 7,756,790 B2 | 7/2010 | Buerger | |
| 7,797,174 B2 | 9/2010 | Samuels | |
| 2002/0165740 A1* | 11/2002 | Saunders | 705/4 |
| 2003/0074233 A1* | 4/2003 | Lee | 705/4 |
| 2003/0208385 A1* | 11/2003 | Zander et al. | 705/4 |
| 2004/0181435 A9* | 9/2004 | Snell et al. | 705/4 |
| 2004/0236612 A1* | 11/2004 | Heusinkveld et al. | 705/4 |

(Continued)

FOREIGN PATENT DOCUMENTS

| | | |
|---|---|---|
| EP | 1351177 | 11/2002 |
| EP | 1351177 | * 10/2003 |

OTHER PUBLICATIONS

Mass Mutual Rewards Wellness in New Whole Life Product. Best's Review / Life-Health Insurance Edition; May 1994, vol. 95 Issue 1, p. 80.*

(Continued)

*Primary Examiner* — Robert Niquette
(74) *Attorney, Agent, or Firm* — K&L Gates LLP

(57) ABSTRACT

An insurance company sells a life insurance policy having a coverage period. The policy provides a total benefit amount which includes an all-cause benefit amount and an accidental death only benefit amount. The policy is initially underwritten on a limited basis and the ratio of the all-cause benefit to the accidental death benefit is low. The insured has the option of providing material to enable comprehensive underwriting and to enable risk classification. If the risk classification improves the policy benefits, the mix of coverage is adjusted to include a higher ratio of the all-cause benefit amount to the accidental death only benefit amount. If the insured does not provide any additional information or materials, or if the materials provided do not result in an underwritten risk classification that enables the policy provisions to be improved, the mix of coverage remains unchanged.

26 Claims, 4 Drawing Sheets

U.S. PATENT DOCUMENTS

| | | | |
|---|---|---|---|
| 2007/0021987 A1* | 1/2007 | Binns et al. | 705/4 |
| 2007/0094053 A1* | 4/2007 | Samuels | 705/4 |
| 2008/0082370 A1* | 4/2008 | Collins et al. | 705/4 |
| 2008/0109263 A1* | 5/2008 | Clark et al. | 705/4 |
| 2008/0114620 A1* | 5/2008 | Donnelli | 705/4 |
| 2009/0024422 A1 | 1/2009 | Zarrella et al. | |

OTHER PUBLICATIONS

"Life Underwriting Requirements Guide", ING North America Insurance Corporation, Jan. 2009.

* cited by examiner

SYSTEM AND METHOD FOR SELLING INSURANCE USING RAPID DECISION TERM

PRIORITY CLAIM

This application is a continuation of, and claims priority to and the benefit of U.S. patent application Ser. No. 12/260,706, filed on Oct. 29, 2008, which is a continuation-in-part of, and claims priority to and the benefit of U.S. patent application Ser. No. 12/013,962, filed on Jan. 14, 2008, each of which are incorporated in their entirety herein by reference.

TECHNICAL FIELD

The present disclosure relates in general to life insurance, and in particular to methods for selling life insurance, such that full coverage begins before a policy is comprehensively underwritten.

BACKGROUND

When a person purchases a life insurance policy from an insurance company, the insurance company agrees to provide a benefit to one or more designated beneficiaries upon the occurrence of an insured event. The insurance company and the policy owner enter into a contract, whereby the insurance company agrees to pay a sum of money (the benefit) upon the insured's death (the insured event). In exchange, the policy owner agrees to pay fees at regular intervals (the premiums) in amounts determined based on the insurance company's classification of the individual within its risk classification system. A life insurance policy is typically purchased by or on behalf of an individual to be insured, and upon purchasing the policy the purchaser designates one or more individuals or entities (the beneficiaries) to receive the benefit under the policy if and when an insured event occurs. Typically, the policy owner begins paying premiums coincident to commencement of coverage under the policy.

Sellers of life insurance policies face countervailing concerns when determining who to insure, how much to charge for coverage and the amount of coverage to provide. On one hand, offering customers large benefits at low premiums is a major selling point, and maximizes the number of insurance policies sold. On the other hand, insurance companies expose themselves to a great deal of risk with each insurance policy sold. As an example, if an insurance company sells a policy with a benefit amount of $500,000.00 and monthly premiums of $1,000.00, more than 40 years will elapse before the sum of the premiums received by the insurance company exceeds the benefit amount. If an insured event occurs early in the policy's term (e.g., the insured dies), for instance in the first five years, the insurance company is contractually obligated to distribute a large sum of money after having received only a small sum from premium payments. Insurance companies can mitigate this risk somewhat by increasing premiums, but doing so severely deters potential purchasers of insurance policies.

As a result of the risk inherent in selling life insurance policies, the goal of any life insurance company is to accurately predict the mortality rates of classes of individuals. Life insurance companies define classes based on risk factors, predict mortality rates for each class, and attempt to accurately classify prospective insureds based upon factors believed to be related to life expectancy. To ensure accurate classification of each prospective insured, each policy may be underwritten based on predetermined risk factors such as age, sex, family medical history, the medical history and current health of the individual, motor vehicle records (MVRs), and other pertinent information. Accurate underwriting requires accurate assessment of risk factors, accurate classification of prospective insureds, and, assuming accurate prediction of mortality rates, enables successful mitigation and spreading of risk.

Individual life insurance policies are generally underwritten on either a limited or a comprehensive basis. Limited underwriting typically involves asking the prospective insured a series of questions about his or her medical history and perhaps searching various remote databases to determine information about the prospective insured, such as age, domicile, prescription medication taken, and criminal and driving history. Comprehensive underwriting (also referred to as medical underwriting) typically involves analyzing the results of a series of medical tests and review of attending physician records to verify the answers to a series of questions about the health history of the prospective insured. With comprehensive underwriting, the prospective insured is usually required to provide blood, urine, or other tissue samples to be tested by a laboratory or other medical professional, and the results are submitted to a life insurance underwriter. Based on the results of the medical tests and the prospective insured's answers to the questions, the insurance company classifies the risk associated with the prospective insured by placing them in predefined classes. The insurance company (or other insurer) sets the premiums and benefit amount according to the mortality rates associated with the appropriate classes.

Requiring prospective insureds to undergo extensive medical testing before receiving insurance coverage is a major deterrent to the potential sale of an insurance contract. Besides being deterred by the physical invasiveness inherent in the comprehensive underwriting procedure, prospective insureds often hope to obtain coverage for the full desired amount immediately upon applying for an insurance contract, and always hope to pay a reasonable rate for coverage. Life insurance companies, on the other hand, hope to sell as many policies as possible but also hope to manage risk by not providing coverage without reasonably thorough underwriting, a process that usually takes weeks or even months to complete.

In response to these concerns, methods of selling insurance involving a range of less than comprehensive underwriting have evolved. This range is defined by striking different balances between the invasiveness of the underwriting, the timeliness of the underwriting, and the price paid for initial coverage. Generally, a consumer is provided some amount of coverage immediately upon acceptance by the insurance company of application and payment of a first premium. Both the amount of coverage and the premiums vary, however, based on whether the insured is covered by a simplified issue policy or some form of temporary insurance.

Some insurance companies issue so-called "simplified issue" insurance policies, typically in response to applications with just five or six questions about the health of the prospective insured. A simplified issue policy provides coverage following the insured's representations in the application and payment of the first premium, with coverage beginning upon the insurance company's acceptance of the application for insurance. Simplified issue policies are initially underwritten on a limited basis by asking the prospective insured a short series of questions about the medical history and current health of the prospective insured. Such policies represent a great deal of risk to an insurance company because there is little opportunity to verify the prospective insured's responses to the questions or determine health conditions or other pertinent risk information beyond the few questions answered by the applicant. To mitigate this risk, insurance companies typically charge relatively high premiums for simplified issue coverage and may void the coverage if false answers were provided and death occurs during the policy's contestable period (usually two years).

The life insurance industry has developed alternative mechanisms to provide limited duration life insurance coverage in advance of issuing a medically underwritten policy. One variation includes providing coverage for only a limited time, and typically provides coverage after the insured risk has been underwritten on only a limited basis. Agreements defining such limited coverage typically include limitations on the period of coverage, the face amount available to a beneficiary, and/or the conditions imposed by the insurance company.

One common example of limited duration insurance coverage is coverage provided by agreements known as temporary insurance agreements. These agreements may precede issuance of medically underwritten policies. When it sells a temporary insurance agreement, an insurance company usually agrees to provide insurance coverage for a specified, limited period of time. Typically, this period of time begins to run on a date on which a proposed insured submits to a medical examination. When the specified, limited period of time expires, the insurance company is typically no longer under any obligation to provide coverage of an insured's life under the temporary insurance agreement.

Another common example of limited duration insurance coverage is a type of coverage known as "conditional receipt coverage." When an applicant receives conditional receipt coverage, the insurance company provides the applicant with a premium receipt which makes the insurance effective only if or when specified conditions are met (e.g. the proposed insured's medical history is as was represented on the application, such that the insurance company issues the policy as applied for). Conditional receipt coverage does not guarantee full coverage until the insured has submitted results of a full battery of medical tests sufficient to enable comprehensive underwriting. Instead, the prospective insured receives conditional coverage between the time the offer for insurance is submitted and the time the underwriter is satisfied by the comprehensive underwriting and the applicant is accepted. If coverage initiated with a conditional receipt continues after comprehensive underwriting, the low premiums reflect a coverage amount equal to the insured's full desired coverage amount provided only after satisfactory completion of comprehensive medical underwriting. Because the comprehensive underwriting provides the insurance company with knowledge of the health of the prospective insured, more accurate classification is possible. Thus, the insurance company can charge lower premiums due to the relatively lesser risk presented by the fully underwritten policy. Satisfaction of the requisite comprehensive medical underwriting, however, requires action on the part of the insured. The insured must submit to an extensive medical examination administered by a qualified physician, a paramedical examiner, or an approved laboratory, and often must submit blood, urine, or other tissue for analysis by a laboratory or other medical professional.

There are downsides to the limited duration methods of providing life insurance in advance of comprehensive underwriting and issuance of the policy desired by the insured. Simplified issue insurance, while it may provide nearly immediate and unconditional coverage, is very expensive to maintain and therefore is not a viable option to many consumers. Temporary insurance agreements, while typically easier to obtain due to coverage being provided temporarily or conditionally in advance of comprehensive medical underwriting, are limited in duration and typically do not satisfy an insured's long-term life insurance needs. Conditional receipt coverage depends for the satisfaction of the condition upon submitting to a rigorous medical testing regimen. If the medical testing is not performed soon after applying for the policy, the policy will not be issued and any temporary coverage will lapse after a short period. Because many potential insureds fail to obtain the required tests in a timely fashion, many who apply for policies never become insured as planned. Even among those who do submit to the required testing, the results of the medical tests may result in the discovery of risk factors that cause the insurance company to classify prospective insureds such that premiums are so high as to be unaffordable, or result in the insurance company making counter offers for higher premiums or lesser amounts of insurance. If medical testing is performed and the results indicate a classification other than as applied for, the insurance company's obligation is usually limited to a return of premiums.

SUMMARY

In the method described herein, an insurance company (or other insurer) sells a life insurance policy having a coverage period equal in length to the level premium period or another coverage period available under the policy. For example, the coverage period may be a term of years of the policy (e.g. 20 year level premium term), or it may alternatively be equal in time to the period of life of the insured individual (e.g. whole life). The initial premiums paid by the insured may be comparable to the premiums paid for standard conditional receipt coverage or comprehensively underwritten policies, but generally may be lower than the typical premiums paid for standard simplified issue policies with similar benefit amounts. The insurance company may accept or reject the application after reviewing the information on the application and completing underwriting of the application on a limited basis, preferably using information available in prescription drug databases, department of motor vehicle databases, databases of medical and non-medical information provided by the Medical Information Bureau, or other suitable databases. After policy issuance, the insured has the option of providing medical test results, blood, urine, and/or tissue samples to the insurance company for review by the underwriter within some contractually defined period of time, for example, at some point in time prior to the expiration of the contestability period of the policy. The test results, blood, urine, and/or tissue samples provided must be sufficient to enable comprehensive medical underwriting. If the insured provides the required medical information and material, then an underwriter comprehensively underwrites the insured after the insurance policy has been issued. If the results of the underwriting are satisfactory, the premiums owed by the insured may be reduced significantly for the remainder of the term of the insurance policy and/or the benefit amount may be increased. If the insured does not provide the required medical information or material, the premiums remain unchanged, as does the level of coverage initially provided. If the insured provides required medical information but the results of the comprehensive medical underwriting are unsatisfactory, the insured may keep the policy initially purchased, but the premiums remain at the relatively high initial level and the benefit amount remains unchanged.

Selling insurance policies in this way enables the insurance company to mitigate its risks but offer the consumer a promptly-issued product with a competitive amount of coverage. The prospective insured is provided coverage for the full coverage period desired at a competitive premium beginning after the application has been underwritten on a limited basis and when the offer for insurance is accepted, without waiting for comprehensive medical underwriting. Further, the insurance company enables the insured to submit information and medical underwriting materials that may be sufficient to reduce the premiums and/or increase the benefit amount at the insured's convenience.

In addition to submitting to a medical examination administered by a qualified physician provided by the insurance company, the prospective insured may alternatively undergo testing performed by any qualified physician, paramedical examiner, or approved laboratory of the insured's choice, including the insured's personal physician. This provides the insured with more convenience and the ability to schedule the required examination coincident with a regularly scheduled physician visit.

In a further embodiment, the insurance company may enable an insured (or other entity purchasing insurance) to purchase an insurance policy which provides mixed or blended coverage for the duration of a policy period. The mixed or blended coverage provided under this type of policy may enable the purchaser to indicate a desired benefit amount for the policy at the time of purchase and to receive immediate or nearly immediate coverage having a total benefit amount equal to the desired benefit amount. Such coverage may provide an unchanging total benefit amount for the duration of the policy period. The blend or mix of coverage may change at various points during policy period to reflect certain risk classifications made by the insurance company.

Preferably, the insurance company provides mixed or blended coverage through a single insurance policy wherein the mix of coverage may change during the policy period through substitution of policy schedules. Such schedules may be amended, cancelled, or modified throughout the coverage period of the policy to effect changes in the mix or blend of coverage provided by the policy. Alternatively, the insurance company may provide such mixed or blended coverage by providing an insurance policy, which includes a first type of coverage and one or more riders to the insurance policy, which include a second type of coverage.

The insurance company preferably provides the disclosed mixed or blended coverage in the form of an insurance policy including a plurality of scheduled benefits. The schedules of such a policy may provide mixed or blended coverage which includes an all-cause coverage portion and an accidental death only coverage portion. It should be appreciated that as used herein, the term "all-cause" may refer to insurance coverage which obligates an insurance company to provide a beneficiary designated by an insured with a benefit upon the death of the insured regardless of the cause of death, except for certain causes of death specifically excluded in the policy (e.g., a suicide exclusion). The accidental death portion of the policy may provide coverage having a benefit amount distributable to a beneficiary upon the death of the insured only if the death is caused by an accident. As used herein, the sum of the all-cause benefit and the accidental death only benefit amount is referred to as the total benefit amount of the policy.

The purchaser of insurance may purchase blended coverage which provides a total benefit amount equivalent to the purchaser's desired benefit amount at all times during the policy period. Upon purchasing the policy, a schedule of benefits may define an initial policy period, during which the blended coverage includes a relatively smaller all-cause portion and a relatively higher accidental death only portion. During this initial policy period, certain insured events may result in either the all-cause face amount or both the all-cause face amount and the accidental death only amount being distributed to the beneficiaries of the policy. For example, if the insured dies and the death is accidental (e.g., the insured dies in an automobile accident), the policy may obligate the insurance company to distribute a benefit amount equivalent to the total benefit amount of the blended policy. Alternatively, if the insured dies and the death is non-accidental (e.g., if the insured dies of a disease or sickness), the policy may only obligate the insurance company to distribute the face amount of the all-cause portion of the blended policy to the beneficiary.

The disclosed policy may enable the insured to submit information and/or materials during an initial policy period sufficient to enable comprehensive medical underwriting. This material may be submitted to the insurance company and may enable the insurance company to underwrite the policy and to classify the risk along a continuum of risk classifications. This assignment to a risk class may be based on the relative mortality risk posed by the insured as indicated by the comprehensive medical underwriting.

The blend of coverage provided may vary based on the risk classification. For example, if a risk classification indicates an improvement in policy benefits, the insurance company may modify the blended coverage to provide an increased all-cause benefit amount for the remainder of the term of the policy and a proportionate decrease or elimination of the accidental death only coverage. The magnitude of any modification may be based on the extent to which the risk classification improves the policy benefits. The insured may be offered the option to reduce or waive any premiums owed for such coverage if the risk classification improves the policy benefits.

If the medically underwritten risk classification fails to improve the policy benefits, the insurance company may continue to provide the same level of coverage provided prior to the submission of materials for comprehensive medical underwriting (i.e., a relatively low all-cause benefit amount coupled with a relatively higher accidental death only benefit amount). It should be appreciated that the insurance company may be obligated based on the contents of the insurance policy to continue providing at least the same blend of coverage provided prior to comprehensive underwriting throughout the duration of the policy period, without increasing any premiums owed.

In an example embodiment, the insurance company may comprehensively underwrite the policy and determine that the insured represents a preferred risk. The insurance company may thus alter the blend of coverage such that the face amount of the all-cause portion of the blended coverage is equivalent to the total benefit amount—that is, the insurance company may provide all—cause coverage having a revised policy face amount equal to the desired benefit amount. The results of the comprehensive medical underwriting may alternatively indicate that the insured satisfies the underwriting but does not represent a preferred risk. The insurance company may thus adjust the blend of coverage provided under the policy such that a larger percentage of the total benefit amount is attributable to the face amount of the all-cause portion than was the case at policy issuance, and a relatively smaller percentage of the total benefit amount is attributable to the accidental death only portion. If the risk classification resulting from the comprehensive medical underwriting does not allow for an increase in the policy benefits, (or if the insured fails to timely submit the required information), the insurance company may continue providing blended coverage having the all-cause and the accidental death only components remain as originally issued.

It should be appreciated that the insurance company may determine the blend of coverage from a continuum of blends of coverage. That is, the disclosed policy may not limit the insurance company to determining only preferred risks, satisfactory risks, and unsatisfactory risks. Rather, the results of the comprehensive medical underwriting and/or the quantity of medical information submitted may enable the insurance company to modify the schedules associated with the insurance policy to provide an appropriate blend of coverage from among a continuum of blends of coverage. Any number of risk categories may be utilized, and any number of different blends of coverage may be associated therewith, to enable an insurance company to provide insurance to a broad spectrum of insureds. The continuum of blends of coverage may range from the accidental death only portion providing all or substantially all of the total benefit amount of the policy to the face amount of the all-cause portion providing all or substantially all of the total benefit amount of the policy.

The total benefit amount provided by the mixed or blended coverage may alternatively be provided in the form of an all-cause policy having a potentially modifiable face amount and at least one accidental death rider to the all-cause policy. For example, the insurance company may provide an all-cause policy having a relatively small face amount prior to the insured submitting medical information sufficient to enable comprehensive medical underwriting. The insurance company may provide an accidental death rider to the policy which increases the total benefit amount to the desired face amount indicated by the purchaser at the time of purchase. If the insured submits to comprehensive medical underwriting, the insurance company may assign the insured to a risk class and may adjust the blend of coverage accordingly. For example, the insurance company may increase the face amount of the all-cause benefit provided by the policy and may appropriately modify or replace the accidental death only rider such that the total benefit amount remains equivalent to the desired face amount. It should be appreciated that if the risk classification assigned after medical underwriting is sufficiently favorable, the insurance company may replace the accidental death only rider by modifying the policy to provide an all-cause face amount equivalent to the desired face amount for the remainder of the policy period. As above, the modification to the riders and all-cause policy may not in the usual case require the purchaser of insurance to submit increased premium payments.

It should be appreciated that by providing this additional component of coverage, the disclosed method enables an insured to obtain immediate coverage having a total benefit amount equal to the insured's desired coverage amount, albeit a total benefit amount which is provided for fewer insured events than the all-cause component indicates, together with providing the option to improve the composition of benefits by submitting to medical underwriting after policy issuance.

Additional features and advantages are described herein, and will be apparent from the following Detailed Description and the figures.

DETAILED DESCRIPTION OF EXEMPLARY EMBODIMENTS

Figure 1:
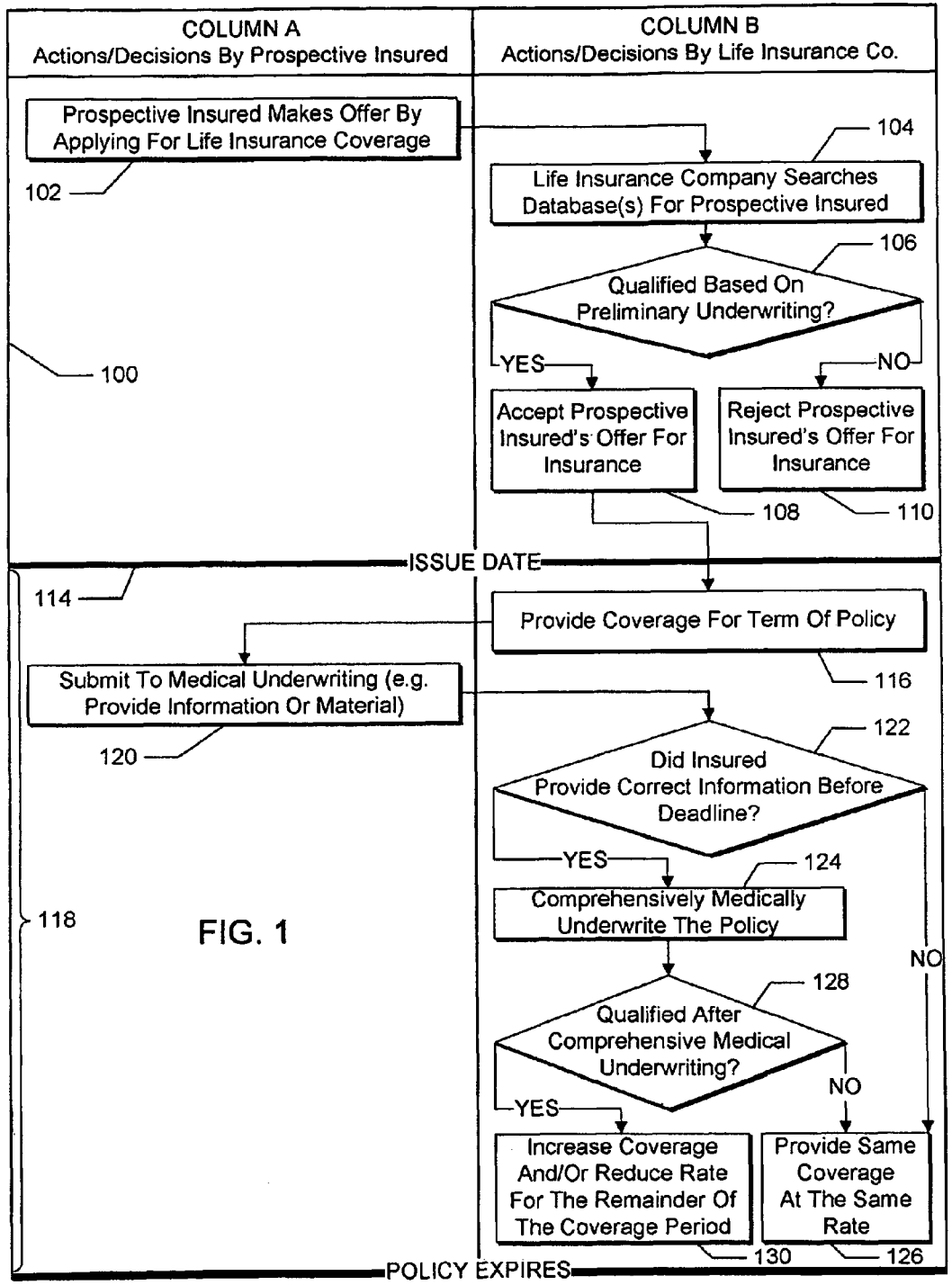
FIG. 1 is a flow chart of an example method of selling life insurance.

FIG. 1 contains a flow chart 100 of an example life insurance policy sales transaction. In FIG. 1, actions taken and decisions made by a prospective insured (purchaser) are included in Column A, and actions taken and decisions made by a life insurance company (seller) are included in Column B. Although the example life insurance sales transaction 100 is described with reference to the flow chart illustrated in FIG. 1, it will be appreciated that many other methods of selling life insurance are contemplated. For example, the order of many of the blocks may be changed, and many of the blocks described are optional.

As illustrated in FIG. 1, the prospective insured makes an offer for a life insurance policy by applying for coverage (block 102). Typically, making this offer includes filling out an application for life insurance, answering questions about the prospective insured's medical history, and paying the first of any premiums due. The life insurance company searches at least one database for information about the prospective insured to underwrite the potential policy on a limited basis (block 104). For example, the insurance company may search a pharmaceutical database containing a listing of all prescription medication taken by the prospective insured, a department of motor vehicles database listing any traffic violations committed by the prospective insured, a Medical Information Bureau database containing medical health reports from other insurance companies about the prospective insured, or other databases. The insurance company searches these databases to underwrite the eventual insurance policy on a limited basis; the database searches enable the insurance company to verify the information provided in the prospective insured's application. Based on the results of the database search, the insurance company assesses a number of risk factors such as age, domicile, prescription medication taken, and criminal and driving history, and places the prospective insured in one of a set of predetermined risk classes.

If the limited underwriting qualifies the individual based on a predetermined set of preliminary qualification parameters (block 106), the insurance company accepts the prospective insured's offer for insurance (block 108). The premiums or other consideration required of the prospective insured may be lower than or similar in price to the premiums paid by an insured purchasing a simplified issue insurance policy with a similar benefit. In this example, prior to comprehensive medical underwriting, the premium amounts or other consideration may be higher than the premiums would be for a medically underwritten policy preceded by conditional receipt coverage with an identical benefit amount. If the limited underwriting disqualifies the prospective insured based on the predetermined set of preliminary qualification parameters, the insurance company rejects the prospective insured's offer for insurance and does not provide coverage (block 110).

Referring still to FIG. 1, as soon as the insurance company completes limited underwriting and accepts the prospective insured's offer for insurance, coverage under the policy or agreement begins. The date of acceptance of the prospective insured's application is known as the "issue date" of the insurance policy, represented by line 114. The insurance company continues to provide coverage to the insured for the duration of the term of the policy (the coverage period) 118 (block 116). If, during the coverage period, the insured satisfies all his or her obligations under the policy and an insured event occurs (e.g. the insured dies), the insurance company is contractually bound to pay the benefit to the designated beneficiaries.

Sometime during the coverage period and after the issue date 114, the insured has the option to submit to comprehensive medical underwriting by providing additional information and/or material to the insurance company, an underwriter, an approved laboratory, or another entity authorized by the insurance company (block 120). The information or material provided enables the insurance company, an underwriter, or another entity to comprehensively medically underwrite the policy. For example, the insured may obtain medical testing and may have blood, urine, or other tissue samples taken by a qualified physician of the insured's choice to satisfy the comprehensive medical underwriting requirements. In this example, the insured receives the benefit of scheduling the medical consultation when it is convenient, and with a qualified physician with whom the insured feels comfortable. Alternatively, the insured may submit to a paramedical examination performed by an appropriate paramedical examiner made available by the insurance company or may choose to provide blood, urine, or other tissue samples directly to an approved laboratory. The comprehensive underwriting requirements may mandate that the insured undergo tests, provide blood, urine, and/or other tissue samples, or any combination thereof. In one example embodiment, satisfying the comprehensive underwriting requirement may be done at the insured's own expense. Alternatively, the insurance company may be responsible for some or all of the cost of satisfying such comprehensive underwriting requirements.

The insured may be required to provide any information, test results, and/or material to the appropriate party within a contractually determined time period. For example, the contract may obligate the insured to provide the required information, test results, and/or material to the appropriate party before the end of the period of contestability of the insurance policy or insurance agreement. The contestability period of a given policy or agreement may be two years; the insured may be required to provide any information, test results, or material before the end of this two year period. Alternatively, the insured may be required to provide any test results, information, and/or before a date not corresponding to the end of the contestability. For example, the period of contestability may be two years, but the insured may be required to provide test results, information, and/or other material within six months of the insurance company's acceptance of the insured's offer for insurance.

If the insured provides the correct additional information, test results, and/or other material before expiration of the contractually-indicated time period for compliance (block 122), the life insurance company, an underwriter, or another entity performs a comprehensive medical underwriting of the insurance policy (block 124). This comprehensive underwriting may involve further testing of blood, urine, and/or other tissue samples submitted to the underwriter, verification of the answers to questions in the original application for insurance based on the results of certain medical tests, and/or further classification of risk based on additional information provided by the insured. Moreover, the comprehensive underwriting may be performed cooperatively by a number of different entities. For example, the insurance company, an underwriter, and/or an independent laboratory may perform a portion of the comprehensive underwriting. If a healthy insured submits the information, test results, and/or other material before a certain date (e.g. within six months of the issue date), additional incentives may apply (e.g. premium rebates, further reduced premiums, and/or an increased benefit).

If the information, test results, and/or other materials provided to the insurance company, underwriter, or other entity was not the full required set of information, test results, and/or other materials, or if the information, test results, and/or other materials were not provided to the proper entity before the expiration of the contractually determined time period (block 122), the insurance company continues to provide coverage in the insured's full desired coverage amount but does not reduce the premiums or other consideration required of the insured or increase the coverage amount for the remainder of the policy term (block 126).

If, after comprehensive medical underwriting, the insured is qualified to receive coverage in the insured's full desired coverage amount at a reduced rate (block 128), the insurance company continues to provide coverage in the insured's full desired coverage amount for the duration of the coverage period 118, but reduces the premiums or other consideration due to an amount consistent with the insurance company's medically underwritten rate class (block 130). The insurance company may alternatively or additionally increase the benefit provided to the insured such that the occurrence of an insured event results in a greater benefit paid to the designated beneficiary or beneficiaries. After policy issuance and subsequent to comprehensive medical underwriting (block 128), if the insured is not classified as qualified for the insurance or not qualified for improved policy benefits, the insurance company continues to provide coverage, but does not reduce the premium amounts or increase the benefit amount (block 126).

The insured may be allowed to continue paying premiums and may continue to receive coverage even if the insured is unable to satisfy comprehensive medical underwriting—that is, the insured may be given the benefit of his or her bargain. For example, if the results of the comprehensive underwriting are not satisfactory, the insured may continue to pay premiums less than or similar to the premiums or other consideration associated with a simplified issue policy, and the beneficiaries may still be entitled to the benefit of the policy or contract if the insured event occurs. If the insured does not satisfy the conditions with regards to the information, blood, urine, or other tissue submitted for comprehensive medical underwriting, the insured may be given the option of replacing the policy with one requiring reduced premiums and providing a reduced benefit.

If the policy is issued for the whole of the life or to a specified age of expiry, the premiums determined by medical underwriting may continue for the contract term. If the policy is issued for a term of years with a level premium for the term, the policy may convert to an Annual Renewable Term (A.R.T.) policy after the level premium period. Such A.R.T. coverage may require annually increasing premiums. The option to continue the policy as an A.R.T. policy may expire when the insured reaches a certain age. For example, the insured may retain the option to pay an annual, increasing renewal fee each year until the insured reaches 95 years of age.

Figure 2:
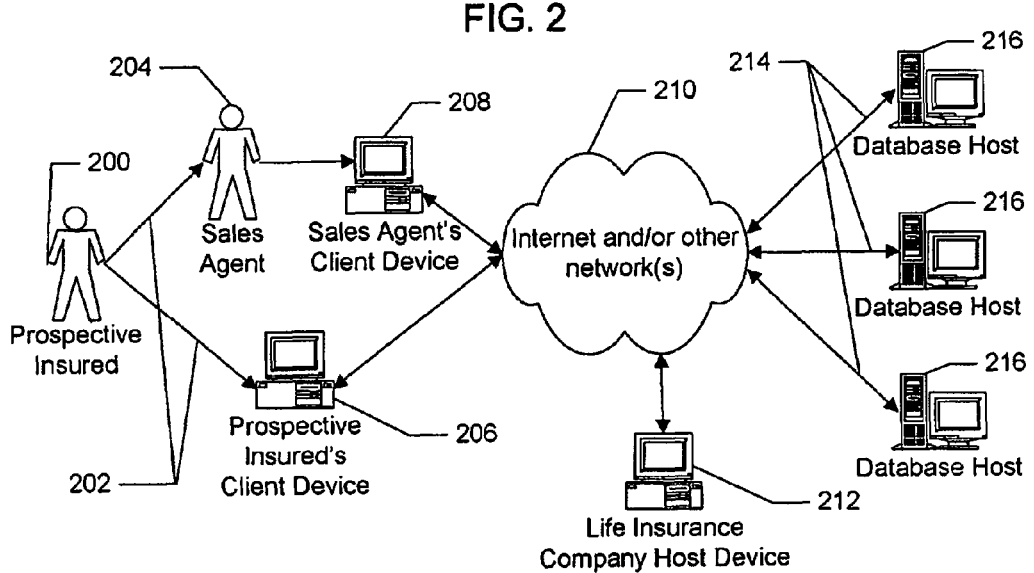
FIG. 2 is a block diagram indicating two example implementations of the method of selling life insurance.

FIG. 2 illustrates two examples of alternative implementations of the method of selling insurance disclosed herein. The prospective insured 200 sends an insurance application 202, which constitutes an offer to purchase insurance, to an insurance sales agent 204 or directly to the life insurance company host device 212 by way of the prospective insured's client device 206. If the prospective insured 200 submits an application for insurance directly to a sales agent 204, sales agent 204 uses the agent's client device 208 to access a network, such as the Internet and/or some other network 210, which enables the agent 204 to send the application to the appropriate the life insurance company host device 212. Similarly, if the prospective insured 200 submits an application for insurance 202 directly to insurance company with the prospective insured's client device 206, the prospective insured's client device 206 sends the application for insurance by way of the Internet and/or some other network 210 directly to the life insurance company host device 212.

As further illustrated by FIG. 2, the life insurance company host device 212 sends a query to a database host 216 and receives a query response 214 over the Internet and/or some other network 210. In different embodiments, the databases searched to perform the limited underwriting include one or more of a pharmaceutical database, a department of motor vehicles database, a database of medical and non-medical information provided by the Medical Information Bureau, and/or some other suitable database. The life insurance company host device 212 receives the query response 214, and based on the query response 214 determines whether to accept the prospective insured's 200 offer for an insurance policy 202.

If the life insurance company host device 212 decides to accept the prospective insured's 200 offer 202, the life insurance company host device 212 may also generate the policy resulting from acceptance of the application. The life insurance company host device 212 then sends the policy either to the prospective insured's 200 client device 206 or to the sales agent's client device 208, depending on how the life insurance company host device 212 received the completed application. If the insurance company host device decides to accept the prospective insured's 200 offer 202, an issue date 114 is established and the insurance company begins to provide coverage. The prospective insured 200 is then provided at least some amount of coverage for the remainder of the coverage period 118.

Figure 3:
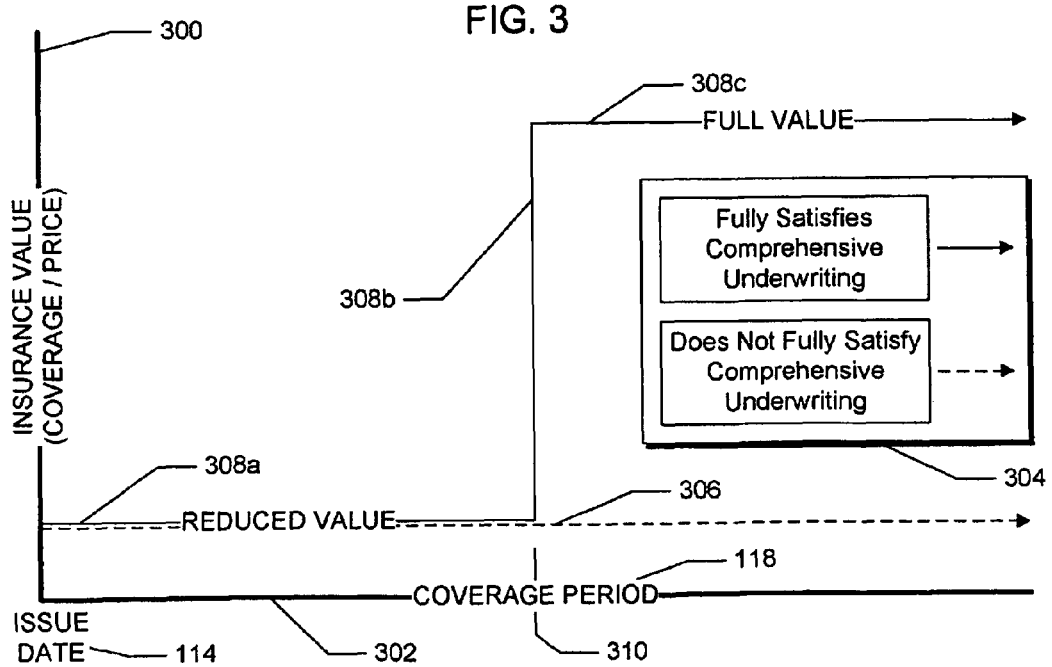
FIG. 3 is a graph displaying an example of the value of insurance provided over time, for one insured that satisfied the comprehensive underwriting requirements and one that did not submit the required test results, blood, urine, or tissue samples to the underwriter.

FIG. 3 illustrates an example of the change in value of insurance coverage that can result from submission of required medical information or material after the issue date 114 but before the end of the coverage period 118. The y-axis 300 of FIG. 3 represents the value of insurance coverage provided, calculated as a coverage level divided by a price. The x-axis 302 represents time beginning at issue date 114. Specifically, the x-axis 302 represents the issue date 114, the coverage period 118, and the underwriting date 310.

As indicated by the legend 304, dashed line 306 represents the value of the insurance if the insured 200 fails to provide any required medical information, test results, and/or material (e.g. blood samples) before the contractually determined compliance date. As noted above, this time period may be within the first six months (or other specified period, usually up to two years) after the issue date of the insurance policy or agreement. Since the insured fails to provide material by the compliance date, dashed line 306 remains constant at a relatively low value even after the underwriting date 310 because failure to submit the required information and/or material means that the insured receives only the benefit of his or her bargain—for example, coverage in the insured's full desired coverage amount at the relatively high initial price.

As further indicated by legend 304, solid line 308 indicates the value of the insurance provided at various time periods during the coverage period 118 if the insured 200 satisfies the comprehensive medical underwriting requirements before the contractually determined compliance date. In this case, all required material is submitted by the compliance date. On the underwriting date 310, an underwriter or other entity comprehensively medically underwrites the policy. Solid line 308 reflects the relative value of insurance coverage provided before and after the underwriting date 310. Segment 308*a* indicates that an insured 200 receives coverage in the insured's full desired coverage amount but at a relatively low value (due to the high premiums charged) beginning on the issue date 114 and continuing until underwriting date 310. Segment 308*b* indicates that if the insured 200 submits the required information and/or material by the compliance date and satisfies the comprehensive medical underwriting on underwriting date 310, the value of the insurance increases due to a reduction in premiums and/or an increase in coverage. Segment 308*c* represents the high value of the insurance after underwriting date 310 due to the continued lower premiums and/or higher coverage.

In one embodiment, the value of insurance represented by dashed line 306 remains substantially constant after underwriting date 310 even if the insured submits the proper test results, information, blood, urine, or other tissue samples because the comprehensive medical underwriting does not qualify the insured for a better rate class or an increased coverage amount. In another embodiment, the coverage is increased based upon the rating classification achieved as a result of medical underwriting. Such increase may be relatively small or large based upon the medical underwriting results. Thus, the value of coverage may be slightly increased despite the insured failing to fully satisfy the comprehensive medical underwriting requirements.

In an further embodiment, the method disclosed herein includes providing an insurance policy having a blend of least two distinct coverage components which each provide a portion of a total benefit amount equal to a desired benefit amount selected by the purchaser prior to the insured submitting the required information and/or materials for comprehensive medical underwriting. The insurance policy may include specific provisions covering the blend of coverage and provisions regarding how the blend of coverage may change during the coverage period. Specifically, the insurance policy may include a plurality of schedules which the insurance company may add, delete, or modify to alter the blend of coverage during the policy period.

The blended coverage may result from providing a policy including a first coverage component with an increasing benefit amount, as discussed above, and a second coverage component with a decreasing benefit amount. The policy may enable the insurance company to alter the blend of coverage provided to the insured during the period of coverage based upon a risk classification of the insured. This risk classification may be made based on an outcome of comprehensive medical underwriting. For example, if the results of comprehensive medical underwriting sufficiently improve the policy benefits, the insurance company may provide coverage to an insured having a first coverage component with a face amount equal to the desired benefit amount. Alternatively, if the results of comprehensive medical underwriting do not result in improved policy benefits, the insurance company may not alter the blend of coverage.

Changes in the blend of coverage provided by the disclosed policy may be implemented by providing a policy including a plurality of scheduled amounts payable upon death, wherein the scheduled amounts vary based on the cause of death. For example, certain scheduled amounts may be based on whether the death is accidental or non-accidental. The scheduled amounts may be amended based on the outcome of the comprehensive medical underwriting. It should be appreciated that by providing such a policy with such adjustable scheduled amounts, the disclosed method enables an insurance company to modify the blend of coverage during the policy period.

Thus, an alternative method for providing insurance coverage includes providing an insurance policy including a plurality of schedules, the schedules defining blended or mixed coverage including multiple types of life insurance coverage providing benefits for multiple sets of insured events. The sum of the benefit amounts associated with each set of insured events may be equivalent to a total benefit amount of the policy. Moreover, the sets of insured events covered by the multiple types of coverage may overlap such that certain insured events obligate the insurance company to disburse a benefit amount based on a first component of the policy and certain other insured events obligate the insurance company to disburse a benefit amount based on both the first component of the policy and a second component of the policy. It should thus be appreciated that certain insured events may obligate the insurance company to provide benefit amounts less than the total benefit amount of the policy, and certain other insured events may obligate the insurance company to provide a benefit amount equal to the total benefit amount of the policy.

For example, an insurance policy may include a plurality of schedules that each defines an all-cause component and an accidental death only component. The all-cause component may obligate the insurance company to disburse a face amount if an insured dies, regardless of the cause of death excluding certain causes of death specifically indicated in the policy (e.g., suicide). The accidental death only component may obligate the insurance company to disburse an accidental death benefit amount if the death of the insured is caused by an accident. Such an insurance policy may thus result in a disbursement of the total benefit amount equal to the sum of the face amount of the all-cause component and the accidental death benefit if a death occurs accidentally, and a disbursement of a benefit amount less than the face amount if a non-accidental death (i.e., death due to sickness or disease) occurs.

The insurance policy may enable the insured to submit medical information and/or materials sufficient to enable an underwriter to classify the risk represented by the policy. Depending on the risk classification resulting from the underwriting, the insurance company may modify the blend of coverage provided. For example, the insurance company may reduce or eliminate the accidental death only portion and may increase the face amount of the all-cause benefit based on a favorable risk classification.

It should be appreciated that by providing an insurance policy having a total benefit amount equal to the desired benefit amount, the disclosed method may provide a consumer with peace of mind based on the ability to obtain a promptly issued policy with a desired total benefit amount immediately upon acceptance of an offer for insurance, rather than having to wait for successful completion of comprehensive medical underwriting.

The multiple components (i.e., the all-cause component and the accidental component) are preferably implemented as a single policy which provides for changing blends of coverage components, as discussed above. The single policy may include a plurality of schedules defining differing blends of coverage. By adding, deleting, and/or modifying the benefit schedules, the disclosed method enables the insurance company to modify the blend of coverage provided to the insured.

The multiple components or types of coverage disclosed herein may alternatively be implemented as an insurance policy and one or more riders to the insurance policy. The method disclosed herein may include providing coverage to an individual under an insurance policy having a face amount, and providing a rider to the insurance policy which effectively increases the face amount of the policy. For example, the disclosed method may include providing a policy including a potentially changing (i.e., based on the results of comprehensive medical underwriting) all-cause benefit and providing an accidental death benefit rider to the policy such that if an accidental death occurs, the rider obligates the insurance company to disburse an amount equal to the sum of the face amount of the policy and the accidental death benefit of the rider. In this example, if a non-accidental death occurs, only the face amount of the policy (i.e., the all-cause benefit amount) may be provided to the beneficiaries.

The blended policy (or the policy plus rider arrangement discussed above) may enable an insurance company to issue the policy prior to performing comprehensive medical underwriting. For example, the insurance company may sell a policy which takes immediate effect wherein the policy includes a relatively large amount of accidental death only coverage and a relatively small amount of all-cause coverage, and wherein the total face amount (i.e., the sum of the accidental death and all-cause benefits) is equal to a face amount desired by the purchaser. This may enable the insurance company to allow the purchaser to determine a desired face amount, and may enable the insurance company to provide that face amount by selecting an appropriate mix of accidental death only and all-cause benefits which is subject to change upon completion of medical underwriting.

Upon purchasing a policy providing such blended coverage, the purchaser may opt to submit required medical information and materials to the insurance company as discussed above. If the insurance company receives such information and materials, the insurance company (or another underwriting entity) may comprehensively medically underwrite the policy. Depending on the risk classification determined by the comprehensive underwriting, the insurance company may adjust the mix or blend of coverage. For example, if the comprehensive underwriting results in a favorable risk classification, the disclosed method enables the insurance company to increase the all-cause component and to decrease the accidental death only component. Alternatively, the insurance company may terminate one or more riders and/or issue one or more additional riders according to the results of the comprehensive underwriting.

Figure 4:
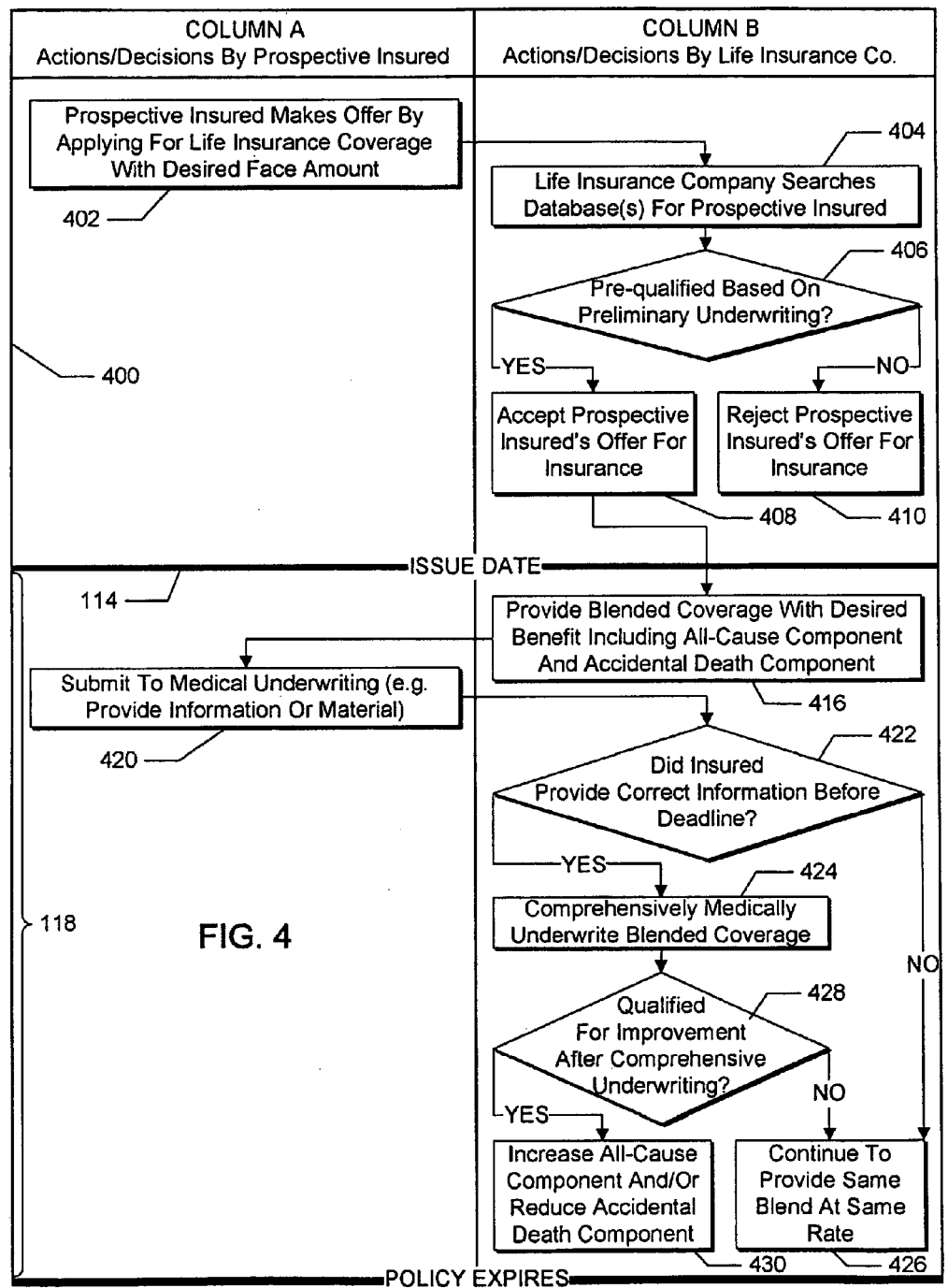
FIG. 4 is a flow chart of an example method of selling life insurance having blended coverage.

FIG. 4 illustrates a flow chart 400 of an example life insurance sales transaction including an additional coverage component prior to comprehensive underwriting. In FIG. 4, as in FIG. 1, actions taken and decisions made by a prospective insured (purchaser) are included in Column A, and actions taken and decisions made by a life insurance company (seller) are included in Column B. Although the example life insurance sales transaction 400 is described with reference to the flow chart illustrated in FIG. 4, it will be appreciated that many other methods of selling life insurance are contemplated. For example, the order of many of the blocks may be changed, and many of the blocks described are optional.

As illustrated in FIG. 4, the prospective insured makes an offer for life insurance coverage by applying for coverage (block 402). Typically, making this offer includes filling out an application for life insurance, answering questions about the prospective insured's medical history, and paying the first of any premiums due. In addition to information submitted about the insured, the application for insurance may also include an indication of a total desired face amount of the coverage (block 402). This indicated total desired face amount may be determined by the insured/individual or entity purchasing the insurance alone or in conjunction with an insurance agent.

Upon receiving the application for coverage (including the desired face amount), the life insurance company searches at least one database for information about the prospective insured to underwrite the potential coverage on a limited basis (block 404). As discussed above, the at least one database may include a pharmaceutical database, a department of motor vehicles database, a Medical Information Bureau database, or any other suitable database. It should be appreciated that the database searches enable the insurance company to verify the information provided in the prospective insured's application and to assess a number of risk factors such as age, domicile, prescription medication taken, and criminal and driving history.

Based on a risk classification facilitated by the database search(es), the insurance company may either accept the application for insurance or deny the application for insurance. Specifically, if the limited underwriting qualifies the individual (block 406), the insurance company accepts the prospective insured's offer for insurance (block 408). If the limited underwriting disqualifies the prospective insured based on the predetermined set of preliminary qualification parameters, the insurance company rejects the prospective insured's offer for insurance and does not provide any coverage (block 410).

If the insurance company accepts an offer for insurance, the insurance company begins provided blended coverage having a total benefit amount equal to the desired benefit amount beginning on the issue date 114 (block 416). It should be appreciated that this blended coverage is preferably provided by a single policy including a plurality of schedules which define the blended coverage. Alternatively, the blended coverage may be provided by a policy in combination with one or more riders, such as an accidental death rider. The insurance company continues to provide this blended coverage for the duration of the coverage period 118, unless and until the insured elects to undergo comprehensive medical underwriting.

As illustrated, the blended coverage includes an all-cause coverage component and an accidental death coverage component (block 416). The sum of the benefit provided by each portion may be equal to the desired face amount. It should be appreciated that the blended coverage provided according to the method disclosed herein thus includes a promptly issued benefit amount equal to the desired benefit amount. It should also be appreciated that prior to comprehensive medical underwriting, the insurance company may only be obligated to disburse the full blended coverage benefit amount if the insured events for both components occur—that is, if the insured both dies and the cause of death is an accidental death. Prior to comprehensive medical underwriting, if the insured dies and the death is not accidental (i.e., the insured dies due to a disease or of natural causes) the insurance company may only obligated to disburse the portion of the blended coverage amount attributable to the all-cause component. It should be appreciated that by providing blended coverage having a desired benefit amount, the insurance company may provide coverage having a relatively high face amount wherein the insurance company is only obligated to disburse the full face amount if a death occurs which is accidental.

Sometime during the coverage period 118 and after the issue date 114, the insured has the option to submit to comprehensive medical underwriting by providing additional information and/or material to the insurance company, an underwriter, an approved laboratory, or another entity authorized by the insurance company (block 420). As above, this information or material enables the underwriter to comprehensively medically underwrite the risk associated with the coverage. The insured may be required to provide any information, test results, and/or material to the appropriate party (if at all) within a contractually determined time period. For example, the contract may obligate the insured to provide the required information, test results, and/or material to the appropriate party before the end of a period of contestability of the insurance coverage or insurance agreement.

If the insured does not provide any medical information and/or material as required, the insurance company may remain obligated to provide the blended coverage, including the all-cause component and the accidental death only component, for the remainder of the coverage period 118 (block 426). This coverage may be provided for the remainder of the coverage period 118 at the same blend of coverage as initially provided (block 426). The contestability period of a given policy or agreement may be two years; the insured may thus be required to provide any information, test results, or material before the end of this two year period. Alternatively, the insured may be required to provide any information, test results, and/or material before a date not corresponding to the end of the contestability. For example, the period of contestability may be two years, but the insured may be required to provide test results, information, and/or other material within six months of the insurance company's acceptance of the insured's offer for insurance.

If the insured provides the correct additional information, test results, and/or other material before expiration of the contractually-indicated time period for compliance (block 422), the life insurance company, an underwriter, or another entity performs a comprehensive medical underwriting of the insurance risk (block 424). If a healthy insured submits the information, test results, and/or other material before a certain date (e.g. within six months of the issue date), additional incentives may apply (e.g. premium rebates, further reduced premiums, and/or an increased benefit).

If the information, test results, and/or other materials provided to the insurance company, underwriter, or other entity were not the full required set of information, test results, and/or other materials, or if the information, test results, and/or other materials were not provided to the proper entity before the expiration of the contractually determined time period (block 422), the insurance company may continue to provide unchanged blended coverage having the desired coverage amount for the remainder of the coverage period (block 426).

After comprehensive medical underwriting (block 428), the insured may be classified and rated in accordance with the insurance company's underwriting guidelines (not shown). The classification may result in the insured being placed in one of a plurality of risk categories ranging from unfavorable risk to favorable risk. It should be appreciated that the risk categories may represent a plurality or continuum of risk categories representing varying degrees of risk.

As illustrated, comprehensive medical underwriting enables the insurance company to determine whether the insured is qualified for improvement in the blend of coverage provided (block 428). If after comprehensive medical underwriting the insured qualifies for improvement in the blend of coverage provided (block 428), the insurance company may increase the all-cause coverage component and/or reduce the accidental death only component for the remainder of the coverage period (block 430). The amount by which the various coverage portions are so altered may depend upon the risk classification made during comprehensive underwriting. For example, more favorable results of comprehensive underwriting may result in larger increases in all-cause coverage and corresponding decreases in accidental death only coverage. It should be appreciated that by increasing the benefit amount provided for death regardless of cause increases the value of the coverage provided (i.e., the beneficiary is more likely to receive the total benefit amount upon the death of the insured). The disclosed method may also enable the insured to increase the value of coverage provided by reducing the premiums owed for blended coverage.

It should be appreciated that if the insured is qualified for a maximum amount of improvement of the blended coverage after comprehensive medical underwriting, the blend of coverage may include only all-cause coverage having a face amount equal to the total benefit amount. Thus, insurance company may become obligated to disburse the full, desired benefit amount upon the occurrence of any insured event regardless of whether the insured event is an accidental death (so long as the event is not one of the specific exclusions contained within the policy).

It should thus be appreciated that the disclosed method may enable an insurance company to provide a blend of coverage from a continuum of blends of coverage based on the risk classification of the insured resulting from the comprehensive medical underwriting. Generally, the more favorable the outcome of underwriting, the more of the total benefit amount may be attributable to the face amount of the all-cause benefit.

In one specific example, upon submission of the required information and materials necessary to perform the comprehensive medical underwriting, the insurance company may determine two or more "satisfactory" underwriting outcomes. The insurance company may determine a "preferred satisfactory" underwriting outcome and a "standard satisfactory" underwriting outcome. If the insurance company determines that an individual is a "preferred satisfactory" underwritten risk, the insurance company may simply increase the face amount of the all-cause coverage to the total, desired coverage amount of the blended coverage without requiring additional premium amounts.

If the insurance company determines that an individual is a "standard satisfactory" underwritten risk, the insurance company may increase the face amount of the all-cause benefit to an amount less than the desired coverage amount of the blended coverage and may reduce the accidental death only benefit amount such that the coverage provided is still blended coverage, but such that a larger percentage or portion of the blended coverage is all-cause coverage. Moreover, the insurance company may provide the purchaser of insurance coverage an option to increase the premium due for coverage in exchange for increasing the all-cause coverage amount to an amount equal to the desired all-cause coverage amount based on medically underwritten rates. This increase in premium may reflect (1) a termination of the accidental death portion of coverage, and (2) an increase in the all-cause portion to equal the originally desired face amount. The insurance company may thus provide the purchaser of insurance a choice to provide a relatively small additional premium in exchange for all-cause coverage equal to the coverage amount of the desired, blended coverage amount. It should be further appreciated that in this additional embodiment, the insurance company provides blended coverage including an all-cause portion and an accidental death only portion, wherein throughout the coverage period the ratio between the two types of coverage may change depending on whether the insured satisfies comprehensive medical underwriting.

It should be appreciated that the categories of "preferred satisfactory" and "standard satisfactory" as risk classification outcomes of comprehensive medical underwriting are provided by way of example only. For example, risks may also be classified as preferred plus, preferred, select, standard, table A or table B of any such class, and denied. Preferred plus may result in more favorable blends and/or more favorable premium rates than all other categories. Table A and table B may represent sub-categories for any suitable risk category, and may represent classifications slightly below the associated category. The potential outcomes which result in coverage blends of the continuum of coverage blends may be any suitable outcome and may result in any suitable blend or mix of coverage being provided to the insured.

Alternatively, if the comprehensive medical underwriting results in a sufficiently favorable risk classification, the disclosed system may enable the insured (or other purchaser of insurance) to elect to extend the coverage period or to receive a more favorable blend of coverage or blended coverage at a reduced rate during the reduced coverage period. For example, the insured may elect to reduce the coverage period by five years in exchange for a reduction in the premium payments due.

The disclosed method may also enable an insurance company to provide coverage to an individual who would otherwise represent an uninsurable risk. For example, a prospective insured may apply for coverage and may indicate a desired benefit amount of one million dollars. The initial underwriting (i.e., the underwriting based on at least one database query) may indicate that the prospective insured represents an unsatisfactory risk at the desired benefit amount. The disclosed method may enable the insurance company to insure the individual for an amount less than the desired benefit amount by providing an appropriate blend of coverage. The disclosed method may enable the insurance company to provide coverage to the prospective insured having a total benefit amount of five hundred thousand dollars (as opposed to the desired one million dollars) and having a blend including primarily accidental death only coverage.

Figure 5:
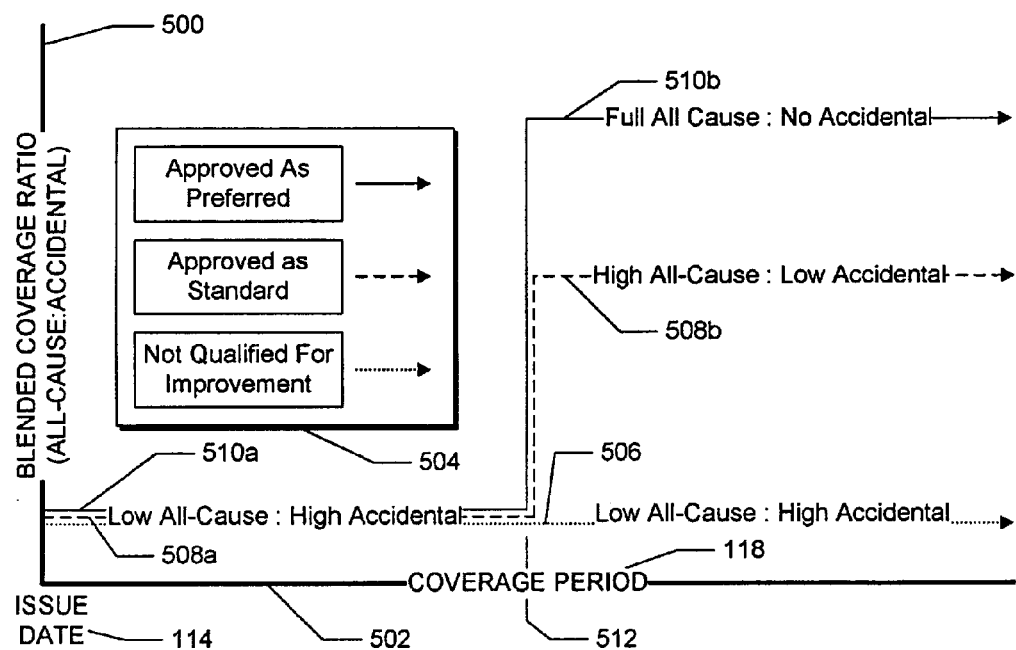
FIG. 5 is a graph displaying an example of the mix or blend of all-cause and accidental death insurance over time, wherein the insurance is sold according to the flow chart of FIG. 4.

FIG. 5 illustrates an example of the change in the blend or mix of the coverage provided according to the method described in the flow chart of FIG. 4. Specifically, FIG. 5 illustrates the changes to the mixed or blended coverage that can result from submission of required medical information or material after the issue date 114 but before the end of the period stipulated for submission to comprehensive medical underwriting. It should be appreciated that the relationships illustrated in FIG. 5 may be applicable regardless of whether an insurance company provides coverage in the form of a single policy including a plurality of components of coverage or in the form of a policy including an all-cause benefit amount and one or more accidental death riders to the policy.

Referring still to FIG. 5, the y-axis 500 represents a blend or mix of all-cause insurance coverage and accidental death only insurance coverage provided during the coverage period. The various components of coverage may be contained in a single insurance policy, or may be a suitable combination of policies and/or riders to the policies. The x-axis 502 represents the coverage period, beginning at issue date 114 and extending until the policy expiration date (not shown). Also illustrated as a point in time on the x-axis 502 is the underwriting date 512, which may represent the day on which the insurance company or other entity acting on the insurance company's behalf completes medical underwriting and makes a determination as to a classification of the underwritten risk.

As indicated by the legend 504, dotted line 506 represents the value of the insurance if the insured 200 fails to provide any required medical information, test results, and/or material (e.g. blood samples) before the contractually determined compliance date, or if the results of the comprehensive medical underwriting indicate that the insured 200 is not qualified for an improvement in the blend of coverage provided. Since the insured does not qualify for improved coverage, the blend of coverage remains constant throughout the policy period, with a low portion of the coverage being all-cause coverage and a high portion of the coverage being accidental death only coverage. Thus, the dotted line 506 remains substantially constant at a relatively low value even after the underwriting date 512.

As further indicated by legend 504, dashed line 508 indicates the mix of coverage, including all-cause coverage and accidental death only coverage, provided during the coverage period 118 if the insured 200 satisfies the comprehensive medical underwriting requirements prior to the contractually determined compliance date, such as on underwriting date 512, and the insurance company determines that the risk is a standard approved risk. Segment 508a indicates that an insured 200 receives coverage having a blend or mix of coverage components including a relatively low amount of all-cause coverage and a relatively high amount of accidental death only coverage beginning on the issue date 114 and continuing until the variable underwriting date 512. Segment 508b represents the mix of coverage including a relatively high amount of all-cause coverage and a relatively low amount of accidental death only coverage after underwriting date 512 due to the insurance company's classification of the risk as a standard approved risk. It should be appreciated that dashed line 508 generally represents a blend of coverage selected from a middle of a continuum of blends of coverage.

Legend 504 also indicates that sold line 510 represents a blend or mix of coverage, including all-cause coverage and accidental death only coverage, provided during the coverage period 118 if the insured 200 satisfies the comprehensive medical underwriting requirements prior to the contractually determined compliance date, such as on underwriting date 512, and the insurance company determines that the risk is a preferred approved risk. Segment 510a indicates that an insured 200 receives coverage having a mix including a relatively low amount of all-cause coverage and a relatively high amount of accidental death only coverage beginning on the issue date 114 and continuing until underwriting date 512. Segment 510b represents that the mix of coverage includes all-cause coverage in an amount equal to the desired amount and no accidental death only coverage after the underwriting date 512 due to the insurance company's classification of the risk as a preferred approved risk. It should be appreciated that solid line 510 generally represents a blend of coverage selected from the top of a continuum of blends of coverage.

It should be appreciated that additional levels of risk classification may exist, wherein one or more of the levels of risk classification do not afford the purchaser of insurance the option to purchase additional all-cause insurance to increase the mix to the level indicated by segment 510b. Thus, it should be appreciated that line segments 506, 508b, and 510b represent three possible blends or mixes of coverage selected from a continuum of possible blends or mixes of coverage.

It should be appreciated that the preceding descriptions of the adjustments to blended coverage provided as disclosed may be provided by a policy without riders that includes scheduled amounts payable upon death that differ in a mount based on the cause of death. Following medical underwriting, the schedules may be modified to reflect the risk classification of the insured individual. It should be further appreciated that any of the principles outlined above with respect to blended coverage are also applicable to blended coverage provided by an insurance policy and one or more riders to that insurance policy.

In summary, persons of ordinary skill in the art will readily appreciate that methods for selling insurance have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention not be limited by this detailed description of examples, but instead by the claims below.

What is claimed is:

1. A system for providing life insurance, the system comprising:
    at least one insurance company host device configured to:
        (a) receive an application for insurance;
        (b) perform at least one database query based on data contained in the application for insurance;
        (c) determine whether to accept the application for insurance based on the at least one database query;
        (d) if the determination is not to accept the application for insurance, send an indication of denial of the application to a sender of the application; and
        (e) if the determination is to accept the application for insurance, generate a policy resulting from the acceptance of the application, the policy obligating an insurer to:
            (i) provide life insurance coverage for a total policy amount in exchange for a first set of premium payments during a first period of time, each of the first set of premium payments having a first amount, and
            (ii) provide the life insurance coverage for the total policy amount in exchange for a second set of premium payments during a second period of time, each of the second set of premium payments having:
                A. a second amount if a set of results of comprehensive underwriting is satisfactory, and
                B. a third amount greater than the second amount if the set of results of comprehensive underwriting is unsatisfactory.

2. The system of claim 1, wherein the comprehensive underwriting includes an analysis of a risk associated with an insured individual.

3. The system of claim 2, wherein the analysis of the risk associated with the insured individual is based on medical testing performed by a third party.

4. The system of claim 3, wherein the medical testing includes analysis of a blood sample of the insured individual.

5. The system of claim 1, wherein the at least one insurance company host device is configured to receive the application for insurance from a prospective insured client device.

6. The system of claim 5, wherein the at least one insurance company host device is configured to receive the application for insurance via a data network.

7. The system of claim 6, wherein the data network includes the Internet.

8. The system of claim 1, wherein the at least one insurance company host device is configured to receive the application for insurance from an agent client device.

9. The system of claim 1, wherein the insurance company host device is configured to perform a database query using at least one database selected from the group consisting of: a department of motor vehicles database, a Medial Information Bureau database, and a publicly available web-based database.

10. The system of claim 1, wherein a difference between the second amount and the third amount is based on the set of results of comprehensive underwriting.

11. The system of claim 1, wherein the at least one insurance company host device is configured to generate an alternate insurance offer if the set of results of the comprehensive underwriting is unsatisfactory.

12. A system for providing life insurance, the system comprising:
at least one insurance company host device configured to:
(a) receive an application for insurance;
(b) perform at least one database query based on data contained in the application for insurance;
(c) determine whether to accept the application for insurance based on the at least one database query;
(d) if the determination is not to accept the application for insurance, send an indication of denial of the application to a sender of the application; and
(e) if the determination is to accept the application for insurance, generate a policy resulting from the acceptance of the application, the policy obligating an insurer to:
(i) provide life insurance coverage for a first policy amount during a first period of time in exchange for a set of premium payments during the first period of time,
(ii) provide the life insurance coverage for a second policy amount during a second period of time in exchange for a second set of premium payments during the second period of time if a set of results of comprehensive underwriting is satisfactory, and
(iii) provide the life insurance coverage for a third policy amount during the second period of time in exchange for the second set of premium payments during the second period of time if the set of results of comprehensive underwriting is unsatisfactory, the second policy amount being greater than the third policy amount.

13. The system of claim 12, wherein the comprehensive underwriting includes an analysis of a risk associated with an insured individual.

14. The system of claim 13, wherein the analysis of the risk associated with the insured individual is based on medical testing performed by a third party.

15. The system of claim 14, wherein the medical testing includes analysis of a blood sample of the insured individual.

16. The system of claim 12, wherein the at least one insurance company host device is configured to receive the application for insurance from a prospective insured client device.

17. The system of claim 12, wherein the at least one insurance company host device is configured to receive the application for insurance from an agent client device.

18. The system of claim 12, wherein a difference between the second policy amount and the third policy amount is based on the set of results of comprehensive underwriting.

19. The system of claim 12, wherein the at least one insurance company host device is configured to generate an alternate insurance offer if the set of results of the comprehensive underwriting is unsatisfactory.

20. A method of providing life insurance, the method comprising:
receiving, on at least one insurance company host device, identification information and underwriting information associated with an insured on an application for life insurance of the insured, the identification information including at least one of a desired benefit amount and a desired premium amount;
causing the at least one insurance company host device to perform at least one database query based on the underwriting information to produce a query result;
causing the at least one insurance company host device to determine whether the person qualifies for the life insurance having the desired benefit amount, the desired policy amount, or both, based on the query result;
causing the at least one insurance company host device to generate an insurance document indicating that a life insurance provider will provide the life insurance, the life insurance having a total benefit amount equal to the desired benefit amount, a premium amount equal to the desired premium amount, or both;
providing life insurance coverage at the total benefit amount for the premium amount without requiring any medical test results associated with the person any time during the coverage period; and
adjusting the life insurance coverage by reducing the total benefit amount during a coverage period, increasing the premium amount during the coverage period, or both, if medical test results associated with the person are received and indicate an unfavorable medically underwritten risk classification.

21. The method of claim 20, including causing the at least one insurance company host device to classify a risk represented by the person based on the medical test results.

22. The method of claim 21, which includes causing the at least one insurance company host device to adjust the life insurance coverage based on the risk classification.

23. The method of claim 20, wherein providing the life insurance coverage includes providing a single life insurance policy including an all-cause component and an accidental death component.

24. The method of claim 20, wherein providing the life insurance coverage includes providing at least one policy and at least one rider to the policy.

25. The method of claim 20, which includes causing the at least one insurance company host device to display a plurality of options for the desired coverage period selected from the group consisting of a term of years, a whole of life of the insured individual, an age attained by the insured individual, and a period of years during which the premium payment remains level.

26. The method of claim 20, which includes causing the at least one insurance company host device to determine that the person does not qualify for life insurance based on the query result and which includes providing life insurance having a reduced benefit amount which is less than the desired benefit amount.

* * * * *